US012745100B2

(12) United States Patent
Omiya et al.

(10) Patent No.: US 12,745,100 B2

(45) Date of Patent: Sep. 22, 2026

(54) RELAY STATION INSTALLATION POSITION CALCULATION DEVICE, INSTALLATION POSITION CALCULATION METHOD, AND INSTALLATION POSITION CALCULATION PROGRAM

(71) Applicant: NTT, Inc., Tokyo (JP)

(72) Inventors: Riku Omiya, Musashino (JP); Masashi Iwabuchi, Musashino (JP); Tomoaki Ogawa, Musashino (JP); Yasushi Takatori, Musashino (JP)

(73) Assignee: NTT, Inc., Tokyo (JP)

( * ) Notice: Subject to any disclaimer, the term of this patent is extended or adjusted under 35 U.S.C. 154(b) by 220 days.

(21) Appl. No.: 18/834,239

(22) PCT Filed: Feb. 17, 2022

(86) PCT No.: PCT/JP2022/006373

§ 371 (c)(1),
(2) Date: Jul. 30, 2024

(87) PCT Pub. No.: WO2023/157174

PCT Pub. Date: Aug. 24, 2023

(65) Prior Publication Data

US 2025/0119756 A1 Apr. 10, 2025

(51) Int. Cl.
*H04W 16/18* (2009.01)

(52) U.S. Cl.
CPC .................................. *H04W 16/18* (2013.01)

(58) Field of Classification Search
CPC .............................. H04W 16/18; H04W 16/26
See application file for complete search history.

(56) References Cited

U.S. PATENT DOCUMENTS

2020/0022000 A1* 1/2020 Venugopal ........... H04B 7/0408
2023/0026783 A1* 1/2023 Furuichi ............. H04W 72/566

FOREIGN PATENT DOCUMENTS

WO WO-03056849 A1 * 7/2003 ........... H04B 1/7113

OTHER PUBLICATIONS

Arai et al., "AMAP: Adaptive Movable Access Point System for Offloading Efficiency Enhancement", IEICE Technical Report, The Institute of Electronics, Information and Communication Engineers, May 2016, RCS2016-43, pp. 107-112, 12 pages including English Translation.

* cited by examiner

*Primary Examiner* — Davetta W Goins
(74) *Attorney, Agent, or Firm* — XSENSUS LLP

(57) ABSTRACT

An installation position calculation device of a relay station according to an embodiment includes: an identification circuitry configured to identify an installed station candidate point at which an LOS region from the relay station is maximized in an installed station candidate range or among a plurality of installed station candidate points predetermined as installation position candidates; a correction circuitry configured to correct a position of each of the identified installed station candidate points based on a Fresnel zone for the relay station; a storage circuitry configured to store, as an installation position of the relay station, the position of the installed station candidate point at which an LOS region from the relay station is maximized among each of the identified installed station candidate points or the corrected installed station candidate points; and a controller configured to control such that the number of installation positions of the relay station.

6 Claims, 9 Drawing Sheets

RELAY STATION INSTALLATION POSITION CALCULATION DEVICE, INSTALLATION POSITION CALCULATION METHOD, AND INSTALLATION POSITION CALCULATION PROGRAM

CROSS-REFERENCE TO RELATED APPLICATIONS

The present application is based on PCT filing PCT/JP2022/006373, filed on Feb. 17, 2022, the entire contents of which are incorporated herein by reference.

TECHNICAL FIELD

The present invention relates to an installation position calculation device, an installation position calculation method, and an installation position calculation program of a relay station.

BACKGROUND ART

For example, in wireless communication systems using high frequency bands, there are wireless communication systems relaying radio waves transmitted from transmission stations to reception stations by reflecting the radio waves by reflecting plates. That is, the reflecting plates are relay stations (relay devices) relaying radio waves.

The reflecting plates reflecting radio waves also include reconfigurable intelligent surface (RIS) reflecting plates capable of electrically changing element characteristics and dynamically controlling reflection characteristics of electromagnetic waves.

In order to construct a wireless communication system relaying radio waves, a method of calculating an installed station position of a base station is known (see, for example, Non Patent Literature 1).

CITATION LIST

Non Patent Literature

Non Patent Literature 1: Takuto Arai and four others, “AMAP: Adaptive Movable Access Point System for Offloading Efficiency Enhancement”, IEICE Technical Report, Institute of Electronics, Information and Communication Engineers, May 2016, RCS2016-43, pp. 107-112

SUMMARY OF INVENTION

Technical Problem

In order to enhance effects of a relay station such as an RIS reflecting plate, it is necessary to locate the relay station at a position within a line of sight (LOS) from a transmission station. That is, it is desirable to determine the position at which the relay station is located so that a region within an LOS (an LOS region) is maximized and a region outside of a line of sight (a non-line of sight (NLOS) region) is minimized.

However, in the technique of the related art, it is only possible to calculate an installed station position of a base station emitting radio waves by itself, and it is difficult to calculate the installed station position of the relay station as it is.

The present invention has been devised in view of the above-described problems, and an object of the present invention is to provide an installation position calculation device, an installation position calculation method, and an installation position calculation program of a relay station capable of calculating an installation position of a relay station so that an NLOS region is minimized.

Solution to Problem

According to an embodiment of the present invention, an installation position calculation device of a relay station includes: an identification unit configured to identify one or more installed station candidate points at which an LOS region from the relay station is maximized based on a range in which the relay station relaying a radio wave is installable or a range in which the radio wave can be relayed by the relay station among a plurality of installed station candidate points predetermined as installation position candidates of the relay station; a correction unit configured to correct a position of each of the installed station candidate points identified by the identification unit based on a Fresnel zone for the relay station; a storage unit configured to store, as an installation position of the relay station, a position of one or more installed station candidate points at which an LOS region from the relay station is maximized among the installed station candidate points identified by the identification unit or each of the installed station candidate points corrected by the correction unit; and a control unit configured to perform control such that the number of installation positions of the relay station stored in the storage unit becomes a predetermined number.

According to another embodiment of the present invention, an installation position calculation method of a relay station includes: an identification step of identifying one or more installed station candidate points at which an LOS region from the relay station is maximized based on a range in which the relay station relaying a radio wave is installable or a range in which the radio wave can be relayed by the relay station among a plurality of installed station candidate points predetermined as installation position candidates of the relay station; a correction step of correcting an identified position of each of the installed station candidate points based on a Fresnel zone for the relay station; a storage step of storing, as an installation position of the relay station, a position of one or more installed station candidate points at which an LOS region from the relay station is maximized among the identified installed station candidate points or the corrected installed station candidate points in a storage unit; and a control step of performing control such that the number of installation positions of the relay station stored in the storage unit becomes a predetermined number.

Advantageous Effects of Invention

According to the present invention, it is possible to calculate an installation position of the relay station so that the NLOS region is minimized.

DESCRIPTION OF EMBODIMENTS

Figure 1:
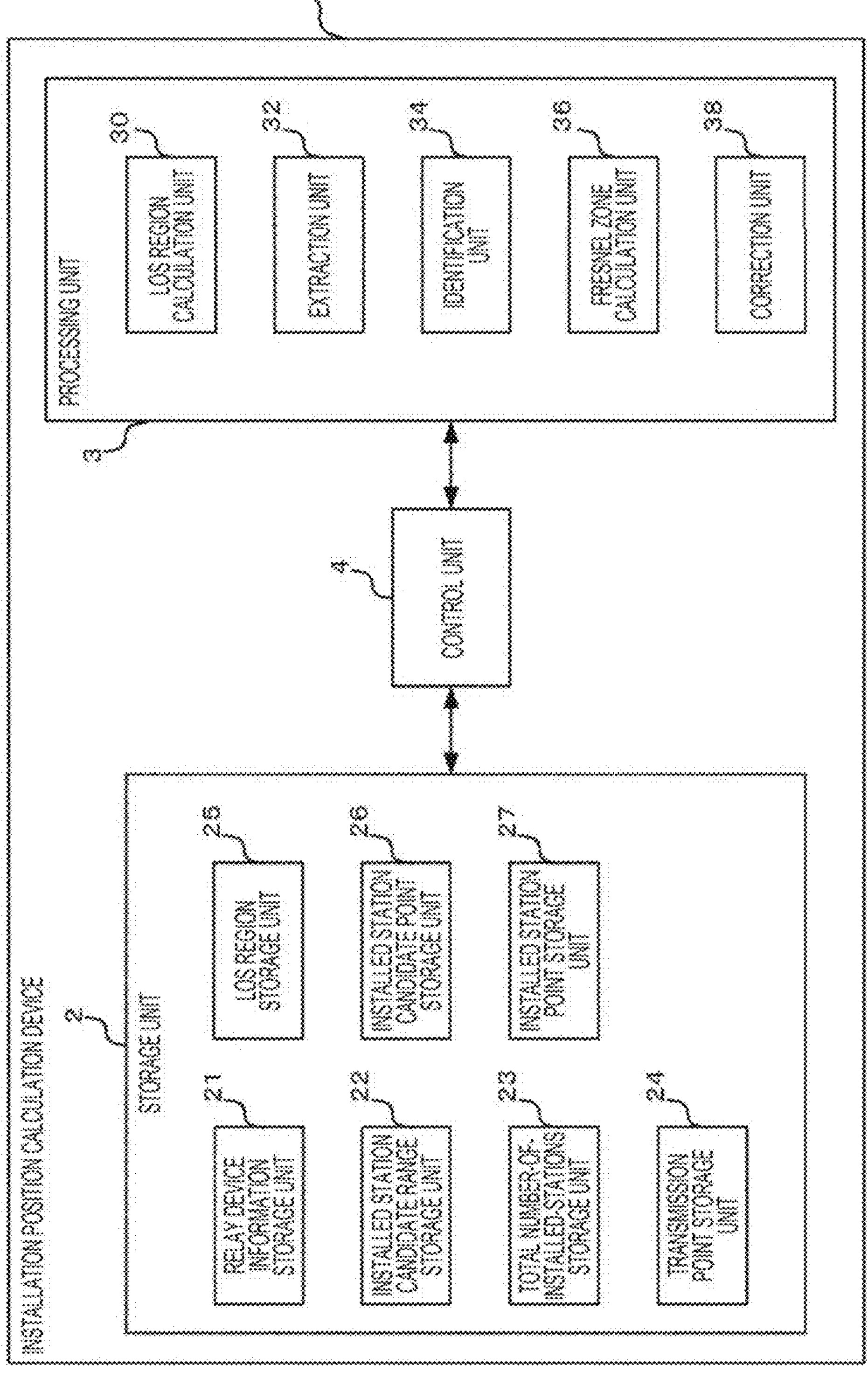
FIG. 1 is a diagram illustrating a configuration example of an installation position calculation device of a relay station according to an embodiment.

Hereinafter, a configuration example of an installation position calculation device 1 of a relay station according to an embodiment will be described with reference to the drawings. FIG. 1 is a diagram illustrating a configuration example of an installation position calculation device 1 of a relay station according to an embodiment.

As illustrated in FIG. 1, an installation position calculation device 1 of a relay station according to an embodiment includes a storage unit 2, a processing unit 3, and a control unit 4 and calculates, for example, an installation position of a relay device (relay station) included in a wireless communication system using a high frequency band.

The control unit 4 controls each unit included in the installation position calculation device 1. The relay device is, for example, a reflecting plate that reflects and relays radio waves. The reflecting plate also includes a RIS reflecting plate.

The storage unit 2 includes, for example, a relay device information storage unit 21, an installed station candidate range storage unit 22, a total number-of-installed-stations storage unit 23, a transmission point storage unit 24, an LOS region storage unit 25, an installed station candidate point storage unit 26, and an installed station point storage unit 27.

The relay device information storage unit 21 stores characteristics and the like of the relay device included in the wireless communication system. For example, the relay device information storage unit 21 stores beforehand information indicating a dynamically controllable relayable range (a relay device cover area: a reflectable angle) in which the RIS reflecting plate serving as a relay device reflects radio waves.

Figure 2:
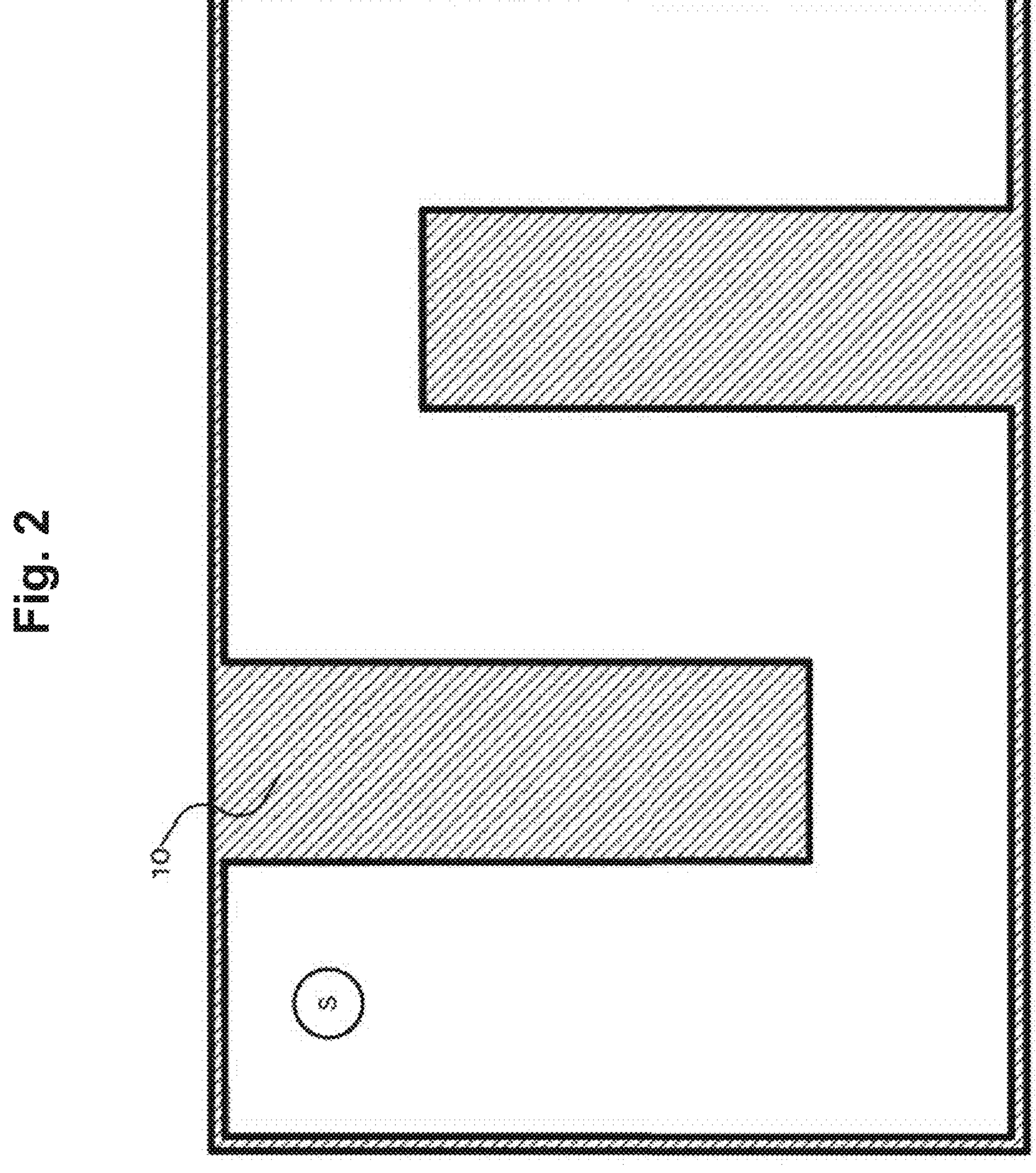
FIG. 2 is a diagram illustrating positions of a transmission station and an installed station candidate range.

The installed station candidate range storage unit 22 stores beforehand a range in which a relay device can be installed as an installed station candidate range. For example, in the example illustrated in FIG. 2, the entire range (the inside of a wall 10) surrounded by the wall 10 is the installed station candidate range of the relay device that reflects a radio wave transmitted by the transmission station S.

The total number-of-installed-stations storage unit 23 stores beforehand the total number of relay devices (total number of installed stations) that the operator plans to install in order to configure the wireless communication system.

The transmission point storage unit 24 stores the position of a transmission point. For example, the transmission point storage unit 24 stores beforehand the position of the transmission station S illustrated in FIG. 2 and the like as a transmission point.

The LOS region storage unit 25 stores the LOS regions from all the transmission points stored in the transmission point storage unit 24.

The installed station candidate point storage unit 26 stores, as an installed station candidate point, a position that has become a candidate point at which a relay device is installed through a process of the processing unit 3. The installed station candidate point storage unit 26 may store a plurality of installed station candidate points determined in advance as installation position candidates of the relay device.

When an installation position of the relay device is determined, the installed station point storage unit 27 stores the position of the relay device as the installed station point. For example, the installed station point storage unit 27 stores, as the installation position (installed station point) of the relay device, the position of one or more installed station candidate points at which the LOS region from the relay device is maximized among the installed station candidate points identified by the identification unit 34 to be described below or the installed station candidate points corrected by the correction unit 38 to be described below. When the installation position of the relay device is determined, the installed station point storage unit 27 also stores the position of the relay device as a new transmission point.

The processing unit 3 includes an LOS region calculation unit 30, an extraction unit 32, an identification unit 34, a Fresnel zone calculation unit 36, and a correction unit 38.

The LOS region calculation unit 30 calculates the LOS region from the transmission points stored in the storage unit 2. For example, the LOS region calculation unit 30 calculates the LOS region illustrated in FIG. 3.

The extraction unit 32 extracts a boundary between the LOS region and the NLOS region from the transmission point for the installed station candidate range stored in the installed station candidate range storage unit 22, and outputs information indicating the extracted boundary to the identification unit 34.

Figure 3:
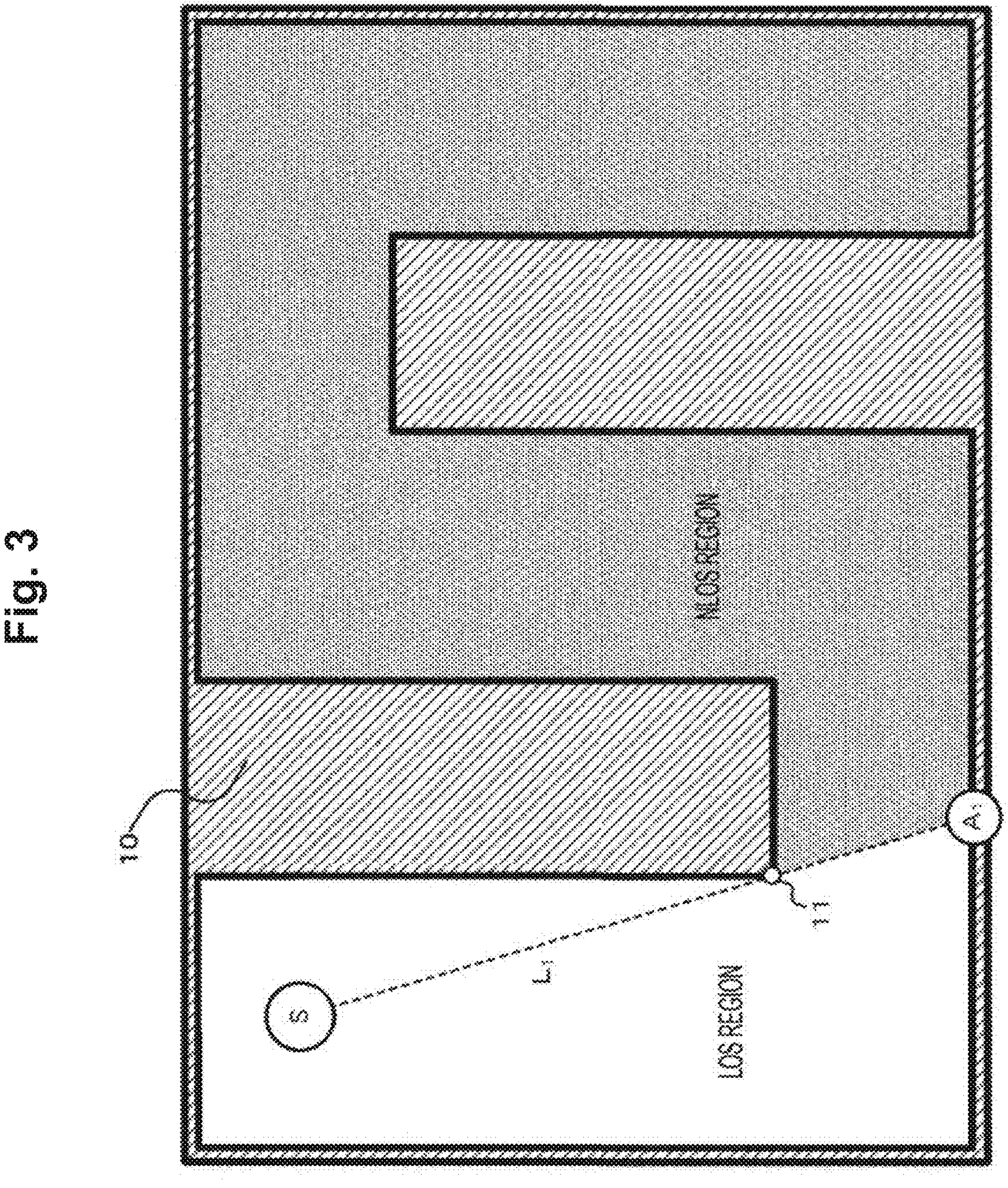
FIG. 3 is a diagram illustrating a boundary between an LOS region and an NLOS region.

For example, the extraction unit 32 extracts a line connecting the boundary point $A_1$ and the boundary point 11 on a straight line $L_1$ passing through the boundary point 11 which is a vertex of the wall 10 illustrated in FIG. 3 and the transmission station S as the boundary between the LOS region and the NLOS region.

The identification unit 34 identifies one or more installed station candidate points at which the LOS region from the relay device is maximized based on the relayable range stored in the relay device information storage unit 21 and the boundary extracted by the extraction unit 32 among the installed station candidate ranges stored in the installed station candidate range storage unit 22 or the installed station candidate points stored in the installed station candidate point storage unit 26.

Figure 4:
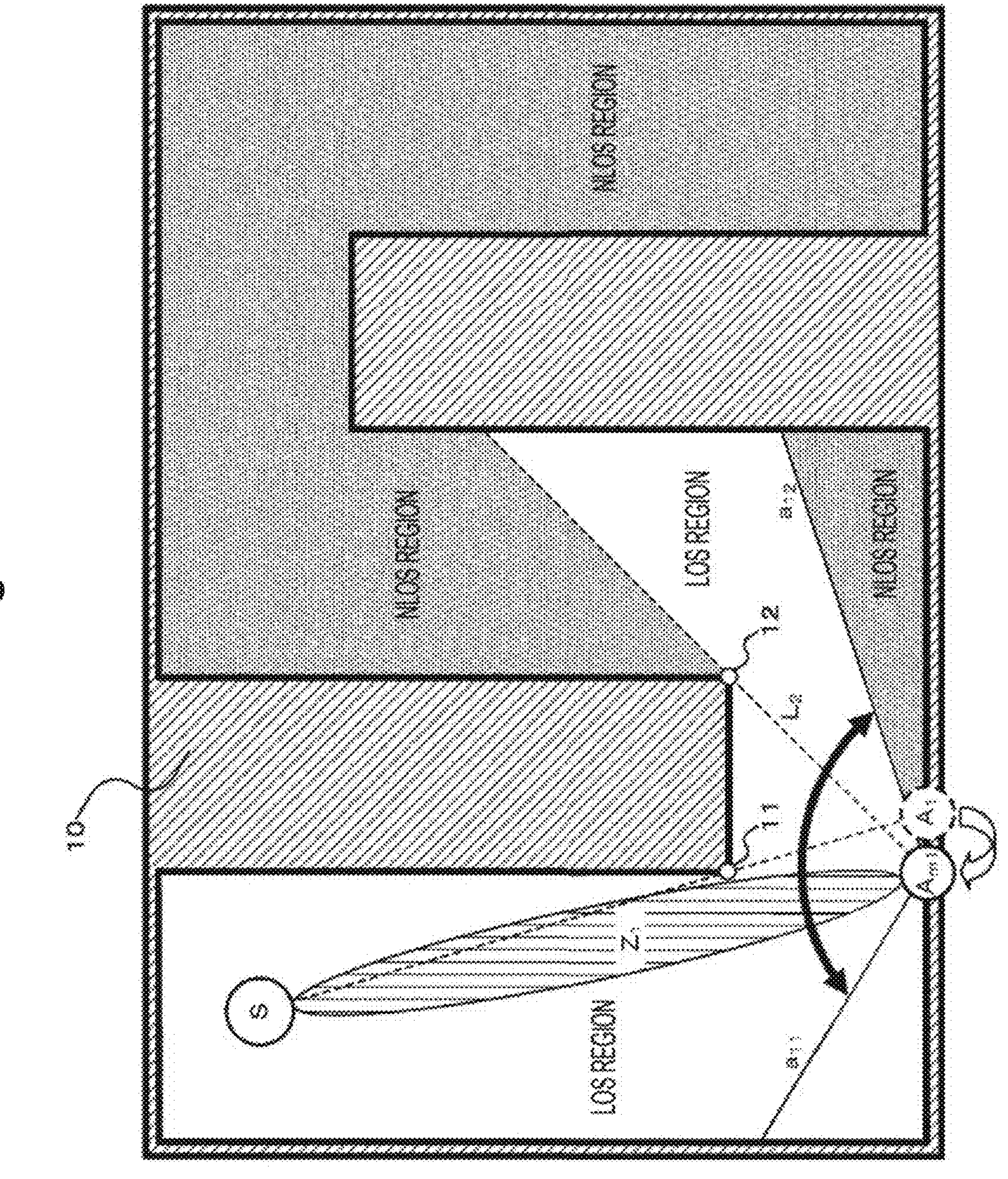
FIG. 4 is a diagram illustrating examples of one-hop corrected installed station candidate points and a boundary between an LOS region and an NLOS region.

For example, the identification unit 34 deletes the boundary point 11 which is a vertex of the wall 10 illustrated in FIG. 4, and the installed station candidate points at which the LOS region does not expand from, for example, the installed station candidate points stored in the installed station candidate point storage unit 26. Then, the identification unit 34 identifies the boundary point $A_1$ as an installed station candidate point at which the LOS region from the relay device is maximized.

The Fresnel zone calculation unit 36 calculates a Fresnel zone between a transmission point and an installed station candidate point (relay device). For example, the Fresnel zone calculation unit 36 calculates a Fresnel zone (the same Fresnel radius as a Fresnel zone $Z_1$ illustrated in FIG. 4) between the transmission station S (not illustrated in FIG. 4) and the boundary point $A_1$.

The correction unit 38 corrects the position of each of the installed station candidate points identified by the identification unit 34 based on the Fresnel zone for the relay device calculated by the Fresnel zone calculation unit 36. More specifically, the correction unit 38 corrects the position of the installed station candidate point identified by the identification unit 34 so that no radio wave obstruction is located in the Fresnel zone between the transmission point and the installed station candidate point.

For example, the correction unit 38 performs correction to move the position of the installed station candidate point from the boundary point $A_1$ to an installed station position $A_{m1}$ so that the boundary point 11 which is a vertex of the wall 10, does not enter the Fresnel zone $Z_1$. Here, the number of one-hop installed station candidate points is 1.

In FIG. 4, when the installation position of the first relay device (one hop) is set to an installed station position $A_{m1}$, a relayable range of the relay device is a range sandwiched between a straight line am and a straight line $a_{12}$. At this time, the boundary between the LOS region and the NLOS region is determined by the straight line $a_{12}$ and a straight line $L_2$ passing through the boundary point 12 which is a vertex of the wall 10, and the installed station position $A_{m1}$.

Then, the control unit 4 performs control such that the number of installed positions of the relay devices stored in the storage unit 2 (the number of installed station points stored in the installed station point storage unit 27) becomes a predetermined number (for example, the total number of relay devices stored in the total number-of-installed-stations storage unit 23).

For example, when the one-hop installed station position is determined, the control unit 4 performs control such that two-hop installed station candidate points are calculated.

Figure 5:
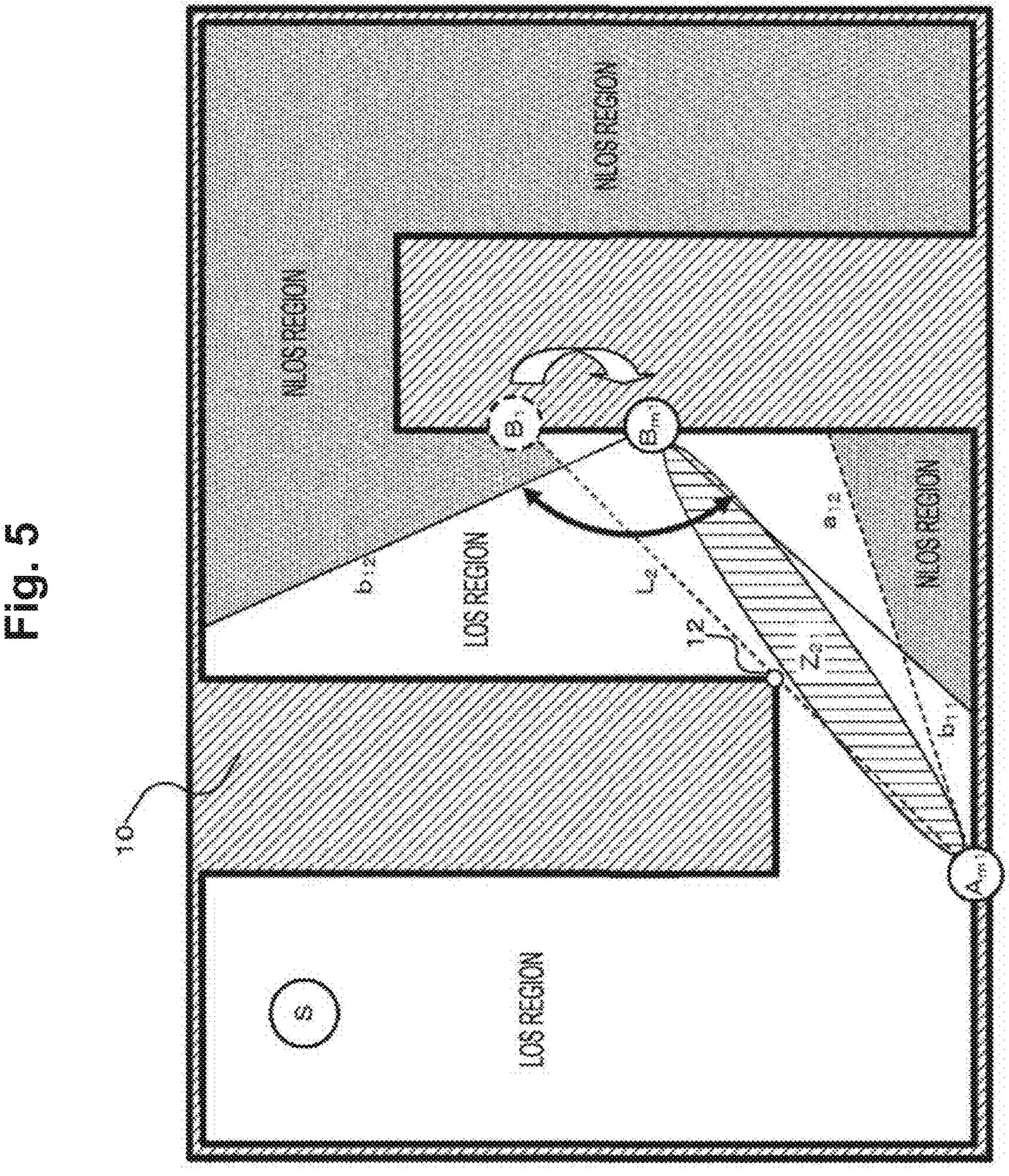
FIG. 5 is a diagram illustrating a two-hop corrected installed station candidate point and a boundary between an LOS region and an NLOS region.

For example, the installation position calculation device 1 deletes the boundary point 12 which is a vertex of the wall 10 illustrated in FIG. 5, from the installed station candidate points. Then, the installation position calculation device 1 identifies a boundary point $B_1$ as one of the two-hop installed station candidate points at which the LOS region from the relay device is maximized.

Then, the installation position calculation device 1 performs correction to move the position of the installed station candidate point from the boundary point $B_1$ to an installed station position $B_{m1}$ so that the boundary point 12 which is the vertex of the wall 10 does not enter a Fresnel zone $Z_{21}$. At the installed station position $B_{m1}$, the LOS region at the installation positions of the two-hop relay devices is largest.

In FIG. 5, when one of the installation positions of the two-hop relay devices is set as the installed station position $B_{m1}$, a relayable range of the relay device is a range sandwiched between a straight line $b_{11}$ and a straight line $b_{12}$. At this time, a boundary between the LOS region and the NLOS region is determined by the straight line $a_{12}$, the straight line $b_{11}$, the straight line $L_2$, and the straight line $b_{12}$.

Figure 6:
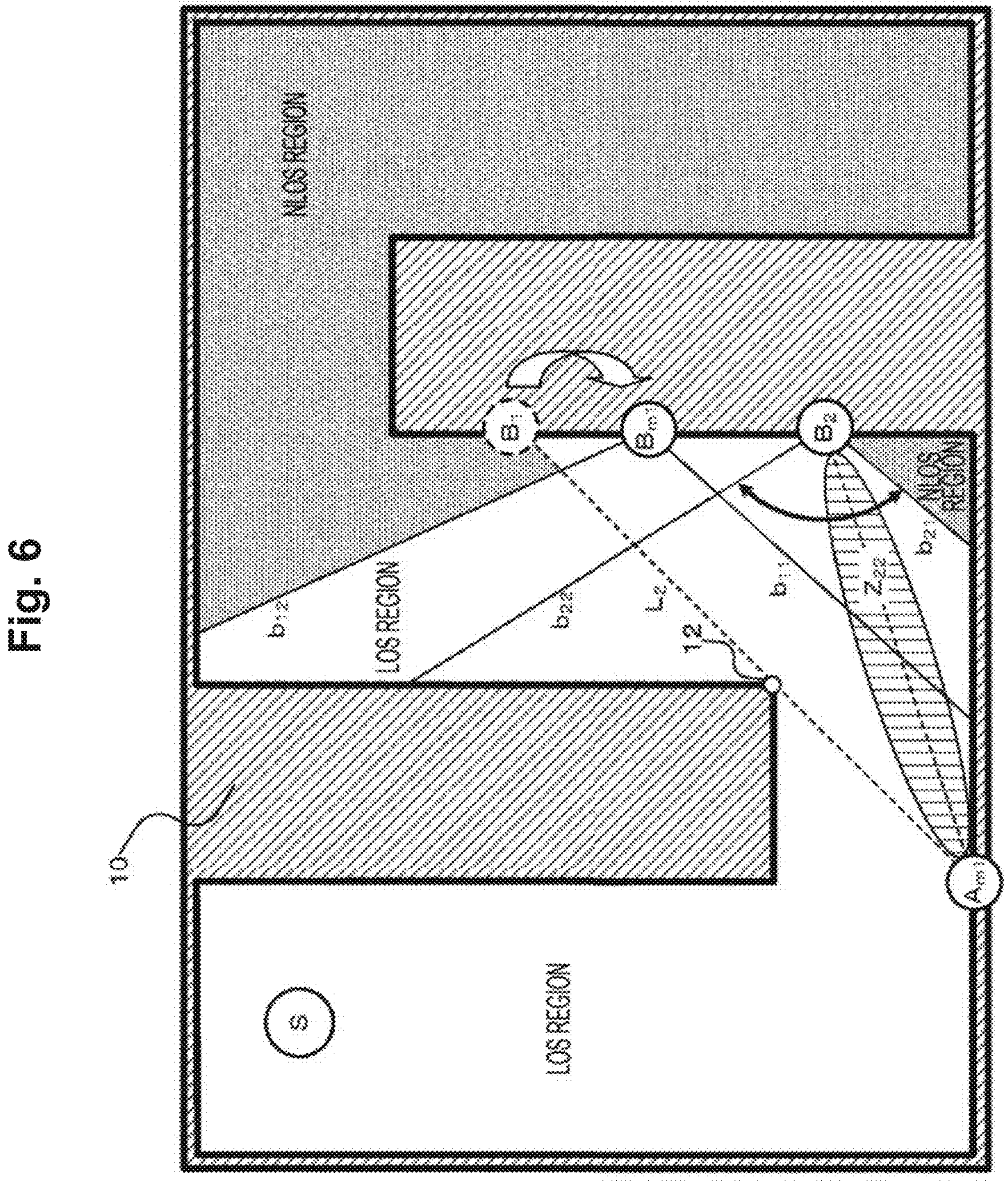
FIG. 6 is a diagram illustrating another two-hop installed station candidate point and a boundary between an LOS region and an NLOS region.

As illustrated in FIG. 6, the installation position calculation device 1 identifies a boundary point $B_2$ as another two-hop installed station candidate point at which the LOS region from the relay device is maximized.

Since there is no radio wave obstruction in the Fresnel zone $Z_{22}$, the installation position calculation device 1 sets the boundary point $B_2$, which is an installed station candidate point as the installed station position $B_2$ without correcting the position of the boundary point $B_2$. In the installed station position $B_2$ of the two-hop relay device, the LOS region is the second largest after the installed station position $B_1$.

In FIG. 6, when another installation position of the two-hop relay device is set as the installed station position $B_2$, a relayable range of the relay device is a range sandwiched between a straight line $b_{21}$ and a straight line $b_{22}$. At this time, the boundary between the LOS region and the NLOS region is determined by the straight line $b_{21}$, the straight line $L_2$, and the straight line $b_{12}$.

Figure 7:
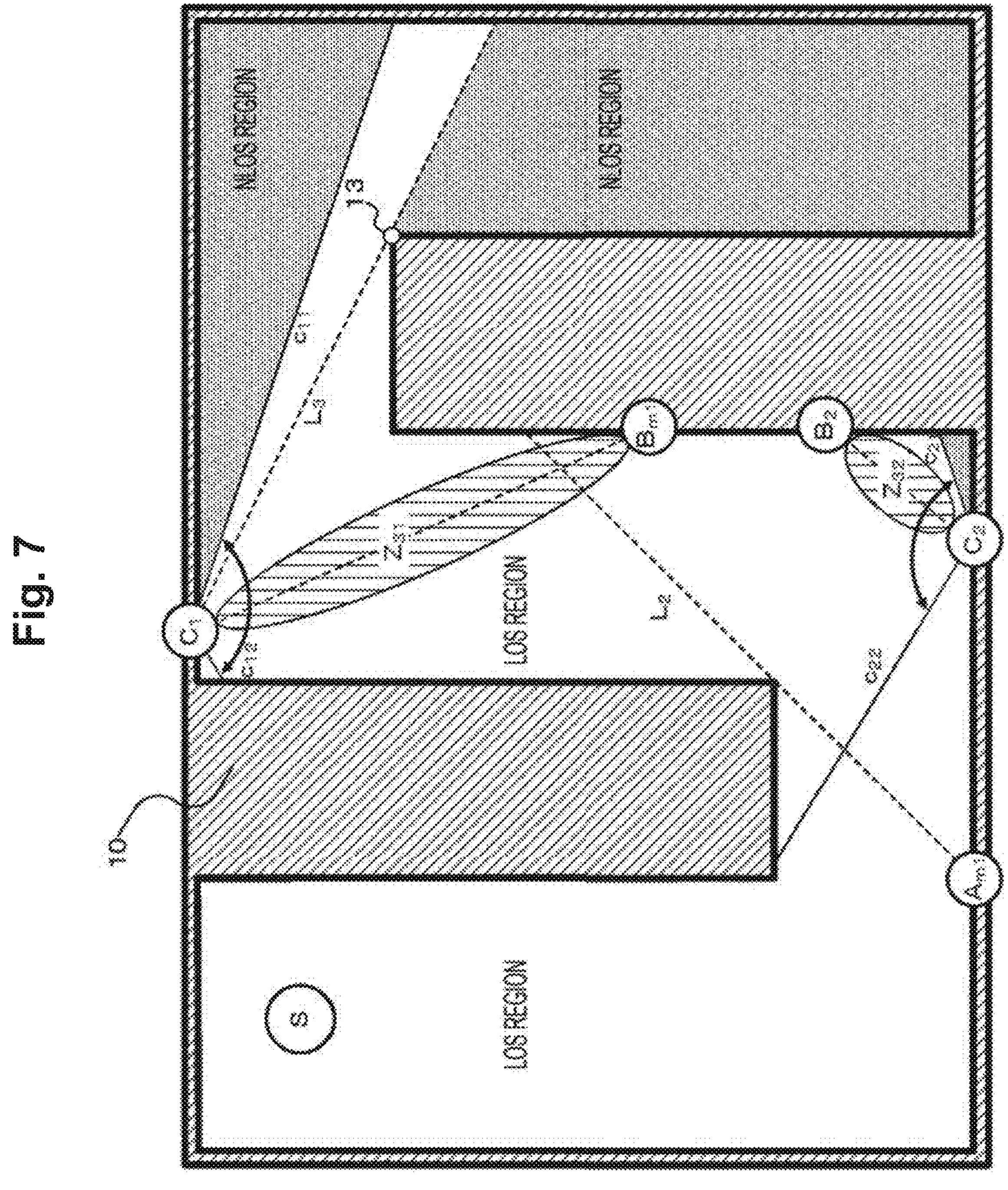
FIG. 7 is a diagram illustrating a three-hop installed station candidate point and a boundary between an LOS region and an NLOS region.

Thereafter, as illustrated in FIG. 7, the installation position calculation device 1 identifies three-hop installed station candidate points $C_1$ and $C_2$ at which the LOS region from the relay device is maximized.

The installation position calculation device 1 sets the installed station positions $C_1$ and $C_2$ without correcting the positions of the installed station candidate points $C_1$ and $C_2$ because there is no radio wave obstruction in Fresnel zones $Z_{31}$ and $Z_{32}$.

When one of the installation positions of the three-hop relay devices is set to the installed station position $C_1$, the relayable range of the relay device is a range sandwiched between the straight line Cm and the straight line $C_{12}$. When the other of the installation positions of the three-hop relay devices is set as the installed station position $C_2$, the relayable range of the relay device is a range sandwiched between the straight lines $C_{21}$ and $C_{22}$.

In FIG. 7, when the installation positions of the three-hop relay devices are the installed station positions $C_1$ and $C_2$, the boundary between the LOS region and the NLOS region is determined by the straight line Cu, a straight line $L_3$ passing through a boundary point 13 that is a vertex of the wall 10, and the straight line $C_{21}$.

Figure 8:
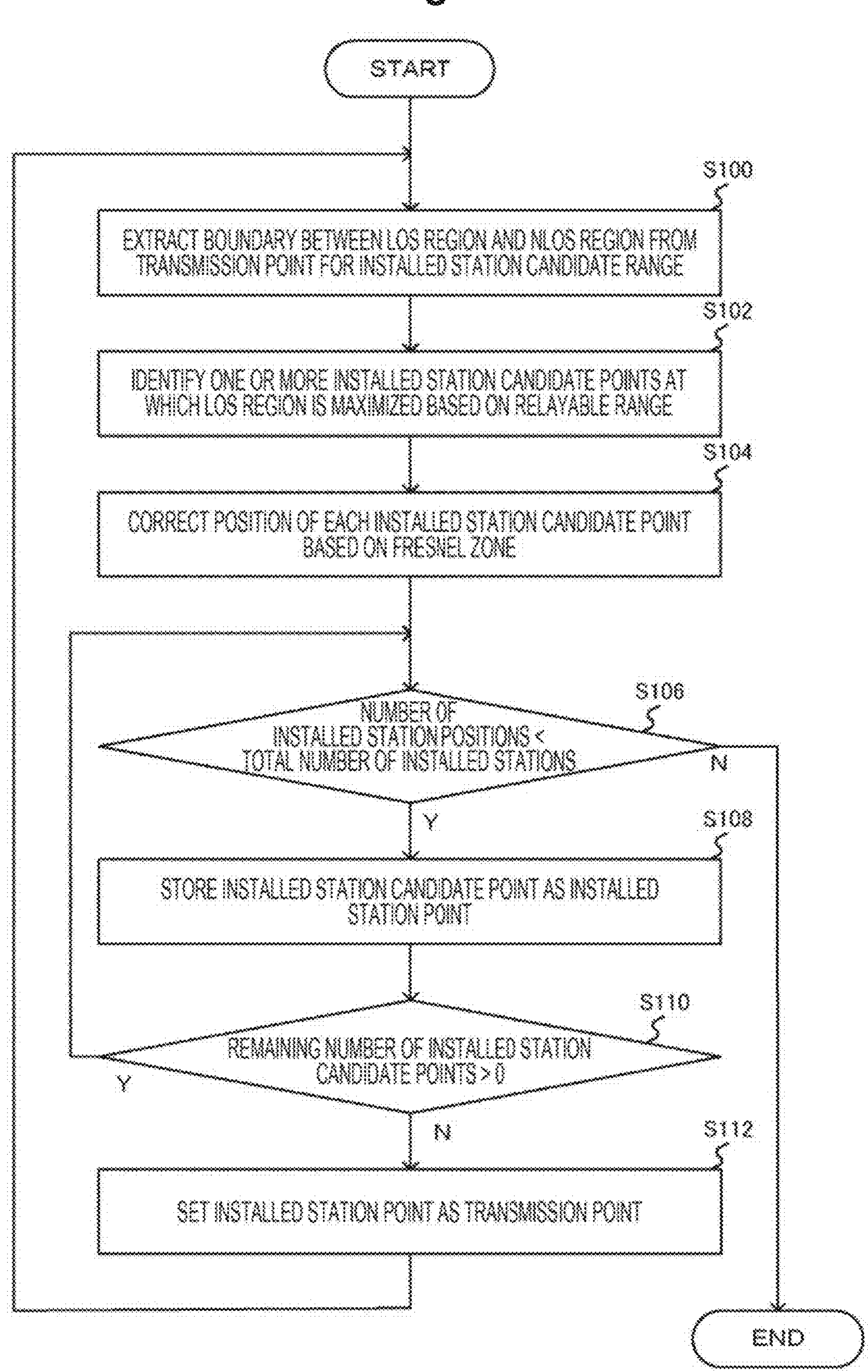
FIG. 8 is a flowchart illustrating an operation example of the installation position calculation device according to an embodiment.

Next, an operation example of the installation position calculation device 1 will be described with reference to FIG. 8. FIG. 8 is a flowchart illustrating an operation example of the installation position calculation device 1 according to the embodiment.

In step 100 (S100), the extraction unit 32 extracts a boundary between the LOS region and the NLOS region from the transmission point for the installed station candidate range.

In step 102 (S102), the identification unit 34 identifies one or more installed station candidate points at which the LOS region is maximized based on the relayable range of the relay device. At this time, the identification unit 34 deletes, for example, a boundary point which is a vertex of the wall 10 and an installed station candidate point where the LOS region does not expand as points excluded from the installed station candidate points.

In step 104 (S104), the correction unit 38 corrects the position of each of the installed station candidate points based on the Fresnel zone calculated by the Fresnel zone calculation unit 36 and sets the position as an installed station position of the relay device.

In step 106 (S106), the control unit 4 determines whether the number of installed station positions of the relay devices calculated by the installation position calculation device 1 is less than the total number of installed stations stored in the total number-of-installed-stations storage unit 23. When the number of installed stations is less than the total number of installed stations (Yes in S106), the control unit 4 moves to the process of S108. Otherwise (No in S106), the control unit 4 ends the process.

In step 108 (S108), the installed station point storage unit 27 stores the installed station candidate point at which the LOS region is maximized as an installed station point. The installed station candidate points at which the LOS region is not the maximum are deleted by, for example, the identification unit 34.

In step 110 (S110), the control unit 4 determines whether the remaining number of installed station candidate points of hops at which the installed station position is currently calculated is greater than 0. When the remaining number of installed station candidate points is greater than 0 (Yes in S110), the control unit 4 returns to the process of S106. Otherwise (No in S110), the control unit 4 moves to the process of S112.

In step 112 (S112), the installed station point is set as a transmission point, and the process returns to S100.

When the installed station candidate points are determined in advance, the installation position calculation device 1 sequentially sets, as the installed station positions, the installed station candidate points from the installed station candidate point at which the LOS region can expand the most among the plurality of installed station candidate points in the LOS region.

In this way, since the installation position calculation device 1 according to the embodiment sequentially sets the positions of one or more installed station candidate points at which the LOS region is maximized as the installation positions of the relay stations, it is possible to calculate the installation positions of the relay stations so that the NLOS region is minimized.

Some or all of the functions of the installation position calculation device 1 may be configured with hardware such as a programmable logic device (PLD) or a field programmable gate array (FPGA), or may be configured as a program executed by a processor such as a CPU.

For example, the installation position calculation device 1 can be implemented using a computer and a program, and the program can be recorded in a storage medium or provided through a network.

Figure 9:
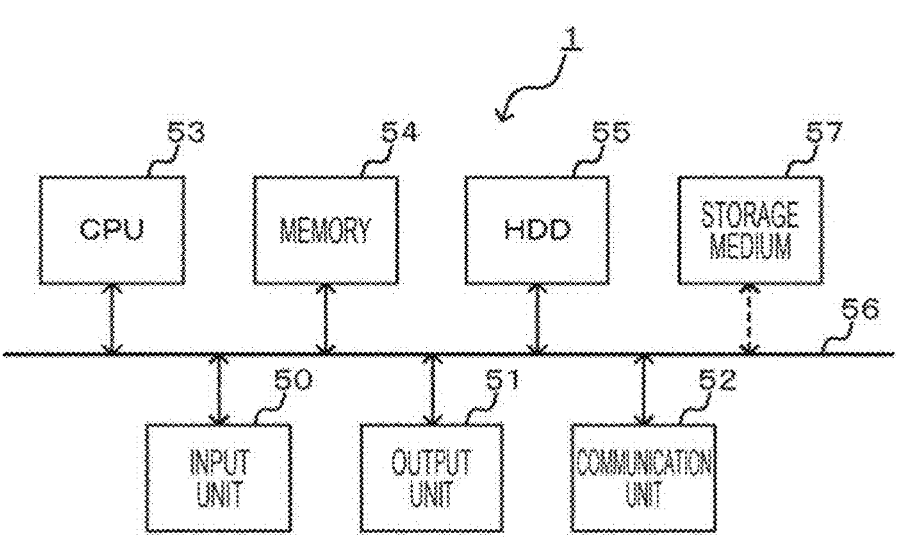
FIG. 9 is a diagram illustrating a hardware configuration example of the installation position calculation device according to the embodiment.

FIG. 9 is a diagram illustrating an exemplary hardware configuration of the installation position calculation device 1 according to the embodiment. As illustrated in FIG. 9, the installation position calculation device 1 has a function as a computer in which an input unit 50, an output unit 51, a communication unit 52, a CPU 53, a memory 54, and an HDD 55 are connected via a bus 56. The installation position calculation device 1 can input and output data to and from a computer-readable storage medium 57.

The input unit 50 is, for example, a keyboard, a mouse, or the like. The output unit 51 is, for example, a display device such as a display. The communication unit 52 is, for example, a network interface or the like.

The CPU 53 controls each unit included in the installation position calculation device 1 and performs a predetermined process or the like. The memory 54 and the HDD 55 correspond to the above-described storage unit 2 that stores data or the like.

The storage medium 57 can store a program or the like executing the function of the installation position calculation device 1. An architecture of the installation position calculation device 1 is not limited to the example illustrated in FIG. 9.

REFERENCE SIGNS LIST

1 Installation position calculation device
2 Storage unit
3 Processing unit
4 Control unit
10 Wall
21 Relay device information storage unit
22 Installed station candidate range storage unit
23 Total number-of-installed-stations storage unit
24 Transmission point storage unit
25 LOS region storage unit
26 Installed station candidate point storage unit
27 Installed station point storage unit
30 LOS region calculation unit
32 Extraction unit
34 Identification unit
36 Fresnel zone calculation unit
38 Correction unit
50 Input unit
51 Output unit
52 Communication unit
53 CPU
54 Memory
55 HDD
56 Bus
57 Storage medium

The invention claimed is:

1. An installation position calculation device for use with a relay station comprising: identification circuitry configured to identify one or more installed station candidate points at which an LOS region from the relay station is maximized based on a range in which the relay station relaying a radio wave is installable or a range in which the radio wave can be relayed by the relay station among a plurality of installed station candidate points predetermined as installation position candidates of the relay station; correction circuitry configured to correct a position of each of the installed station candidate points identified by the identification circuitry based on a Fresnel zone for the relay station; storage circuitry configured to store, as an installation position of the relay station, a position of one or more installed station candidate points at which an LOS region from the relay station is maximized among the installed station candidate points identified by the identification circuitry or each of the installed station candidate points corrected by the correction circuitry; a controller configured to perform control such that the number of installation positions of the relay station stored in the storage circuitry becomes a predetermined number; and an extraction circuitry configured to extract a boundary between an LOS region and an NLOS region from a transmission point at which a radio wave is transmitted, for the installed station candidate range, wherein the identification circuitry identifies one or more installed station candidate points at which the LOS region from the relay station is maximized based on the boundary extracted by the extraction circuitry.

2. The installation position calculation device for use with the relay station according to claim 1,
wherein the correction circuitry corrects the position of the installed station candidate point identified by the identification circuitry such that no radio wave obstruction is located in the Fresnel zone for the relay station.

3. The installation position calculation device for use with the relay station according to claim 1,
wherein the relay station is a reflecting plate that reflects the radio wave.

4. An installation position calculation method for use with a relay station, the method comprising: identifying one or more installed station candidate points at which an LOS region from the relay station is maximized based on a range in which the relay station relaying a radio wave is installable or a range in which the radio wave can be relayed by the relay station among a plurality of installed station candidate points predetermined as installation position candidates of the relay station; correcting an identified position of each of the installed station candidate points based on a Fresnel zone for the relay station; storing, as an installation position of the relay station, a position of one or more installed station candidate points at which an LOS region from the relay station is maximized among each of the identified installed station candidate points or the corrected installed station candidate points in a storage circuitry; controlling such that the number of installation positions of the relay station stored in the storage circuitry becomes a predetermined number; and extracting a boundary between an LOS region and an NLOS region from a transmission point at which a radio wave is transmitted, for the installed station candidate range, wherein, in identifying, one or more installed station candidate points at which the LOS region from the relay station is maximized are identified based on the boundary extracted in extracting.

5. The installation position calculation method for use with the relay station according to claim 4, wherein, in correcting, the position of the installed station candidate points identified in identifying is corrected such that no radio wave obstruction is located in the Fresnel zone for the relay station.

6. A non-transitory computer-readable storage medium storing a installation position calculation program for use with a relay station for causing a computer to function as each circuitry of the installation position calculation device of the relay station according to claim 1.

* * * * *